(12) United States Patent
Wu et al.

(10) Patent No.: US 12,314,224 B1
(45) Date of Patent: May 27, 2025

(54) STORAGE-COMPUTATION INTEGRATED INDEXING SYSTEM AND KEY-VALUE PAIR STORAGE SYSTEM

(71) Applicant: HUAZHONG UNIVERSITY OF SCIENCE AND TECHNOLOGY, Hubei (CN)

(72) Inventors: Bing Wu, Hubei (CN); Dan Feng, Hubei (CN); Wei Tong, Hubei (CN); Jingning Liu, Hubei (CN); Hongjie Luo, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/991,649

(22) Filed: Dec. 22, 2024

Related U.S. Application Data (63) Continuation of application No. PCT/CN2024/073739, filed on Jan. 24, 2024.

(30) Foreign Application Priority Data

Jan. 9, 2024 (CN) .................. 202410030995.X (51) Int. Cl.
  *G06F 16/13* (2019.01)
  *G06F 16/14* (2019.01)
(52) U.S. Cl.
  CPC .......... *G06F 16/137* (2019.01); *G06F 16/152* (2019.01)
(58) Field of Classification Search
  CPC .............................. G06F 16/137; G06F 16/152
  See application file for complete search history.

(56) References Cited

U.S. PATENT DOCUMENTS

| 7,505,295 B1* | 3/2009 | Nataraj | G11C 15/00 365/49.1 |
| 2012/0096221 A1* | 4/2012 | Cheriton | G06F 12/10 711/108 |

(Continued)

FOREIGN PATENT DOCUMENTS

| CN | 108053852 | 5/2018 |
| CN | 113157689 | 7/2021 |

(Continued)

OTHER PUBLICATIONS

Wei Li et al., "A Matrix-Indexed Bloom Filter for Flash-Based Key-Value Store", Journal of Computer Research and Development, vol. 52, No. 5, Dec. 31, 2015, with English abstract thereof, pp. 1210-1222.

(Continued)

*Primary Examiner* — Angelica Ruiz
(74) *Attorney, Agent, or Firm* — JCIPRNET (57) ABSTRACT

The disclosure discloses a storage-computation integrated indexing system and a key-value pair storage system, a controller and multiple array banks capable of operating in parallel are included. The array banks include multiple content-addressable cross-point arrays. In each array, each row is used to store a key and a valid flag bit thereof. The controller is configured to perform an indexing operation on key-value pair data stored in the array. The indexing operation includes an insertion operation, which includes: for key-value pair data $[k_i, v_i]$ to be inserted, searching for a row that does not store a valid key in the array bank mapped by a hash bucket $B_i$ corresponding to a key $k_i$. If search is successful, the key $k_i$ is stored in an assigned row, its valid flag bit is set to valid, the value $v_i$ is written into an array row; otherwise, the operation is returned as failed.

9 Claims, 4 Drawing Sheets

(56) References Cited

U.S. PATENT DOCUMENTS

| | | | |
|---|---|---|---|
| 2015/0286639 A1 | 10/2015 | Bordawekar | |
| 2016/0099810 A1* | 4/2016 | Li | H04L 9/3242 713/193 |
| 2024/0411834 A1* | 12/2024 | Zhang | G06F 17/16 |

FOREIGN PATENT DOCUMENTS

| | | |
|---|---|---|
| CN | 114830108 | 7/2022 |
| CN | 115729847 | 3/2023 |
| CN | 116719813 | 9/2023 |

OTHER PUBLICATIONS

Ling Yang et al., "In-Memory Search With Phase Change Device-Based Ternary Content Addressable Memory", IEEE Electron Device Letters, vol. 43, No. 7, Jul. 2022, pp. 1053-1056.

Huize Li et al., "ReSMA: Accelerating Approximate String Matching Using ReRAM-based Content Addressable Memory", DAC '22: Proceedings of the 59th ACM/IEEE Design Automation Conference, Aug. 23, 2022, pp. 991-996.

Ananth Krishna Prasad et al., "Memristive Data Ranking", 2021 IEEE International Symposium on High-Performance Computer Architecture (HPCA), Feb. 27-Mar. 3, 2021, pp. 440-452.

"International Search Report (Form PCT/ISA/210) of PCT/CN2024/073739," mailed on Sep. 5, 2024, pp. 1-4.

"Written Opinion of the International Searching Authority (Form PCT/ISA/237) of PCT/CN2024/073739," mailed on Sep. 5, 2024, with English translation thereof, pp. 1-6.

\* cited by examiner

Search for a matching
row with key 1010

Reading the value corresponding to the matching row

FIG. 7

Search for a matching
row with key 0100

Updating the value corresponding to the matching row

FIG. 8

Search for a matching
row with key 1010

Clearing the matching row valid flag bit

FIG. 9

STORAGE-COMPUTATION INTEGRATED INDEXING SYSTEM AND KEY-VALUE PAIR STORAGE SYSTEM

CROSS-REFERENCE TO RELATED APPLICATION

This application is a continuation of international application of PCT application serial no. PCT/CN2024/073739 filed on Jan. 24, 2024, which claims the priority benefit of China application no. 202410030995.X filed on Jan. 9, 2024. The entirety of each of the above-mentioned patent applications is hereby incorporated by reference herein and made a part of this specification.

BACKGROUND

Technical Field

The disclosure belongs to the cross field of storage and computing, and more specifically, relates to a storage-computation integrated indexing system and a key-value pair storage system.

Description of Related Art

Key-value storage systems organize data in simple key-value pairs. Each data item consists of a unique key and associated data (value), and is widely used in high-performance, low-latency, scalable, and high-concurrency applications. Data index is an important component of high-performance key-value storage system and can provide efficient data operations and quickly insert, query, update, and delete data (value) corresponding to a given key. Due to the different designs of data index structures, each index structure has its own way of performing data operations, but the structures can generally be divided into two major categories: 1) Tree index structure: the index is organized into a multi-level tree structure, which hierarchically traverses from the root to the leaf nodes to perform operations on the target data, such as B+ tree, log-structured merge tree, skip list, radix tree, etc.; 2) Hash index structure, which directly obtains the index value by applying a hash function to a given key, and then locates the data corresponding to the index value in the linear table to complete the operation. The tree index requires traversing multiple layers of tree nodes, and its query time complexity is usually O(log N), where N is the amount of data stored. The hash index, due to its flat storage structure (linear table), is able to provide query operations within the theoretical time complexity of O(1). However, the hash index is inevitably affected by hash conflicts, that is, multiple keys are mapped to the same position in the linear table after being calculated by the hash function. Regardless of the conflict handling method used, such as the chaining method, the linear probing method, etc., more data access and comparison will be introduced to handle the conflict.

Both the node traversal of the tree index and the conflict handling of the hash index result in more frequent comparisons and memory accesses. This results in a decrease in the efficiency of index operations and affects the storage performance of the key-value storage system. At present, some researchers have proposed new index structures such as learning index. However, the index structure is usually organized into a tree shape, and multiple rounds of calculation, comparison, and memory access still exist, so the efficiency of index operations is decreased. The storage performance of the key-value system still needs to be further improved.

SUMMARY

In view of the defects and improvement needs of the related art, the disclosure provides a storage-computation integrated indexing system and a key-value pair storage system with an aim to utilize the parallel data comparison capability of a cross-point array to complete the indexing operation of key-value pairs of data in a memory, so as to improve the parallelism of the indexing operation and reduce the delay of the indexing operation.

To achieve the above, in an aspect of the disclosure, a storage-computation integrated indexing system including a controller and a plurality of array banks is provided.

In the array bank, each array bank includes a plurality of arrays. Each array is a cross-point array composed of resistive memory cells and content is addressable. In the array, each row is used to store a key and a valid flag bit thereof. When a value of the valid flag bit is $f_v$, it indicates that a corresponding row stores a valid key, when the value of the valid flag bit is $f_i$, it indicates that the corresponding row does not store a valid key, and $f_v \neq f_i$. Initially, the valid flag bit of each row is $f_i$. The plurality of array banks are capable of operating in parallel.

The controller is configured to perform an indexing operation on key-value pair data stored in the array. The indexing operation includes: an insertion operation, and the insertion operation includes the following:

In (I1), for key-value pair data $[k_i, v_i]$ to be inserted, a row with a valid flag bit $f_i$ is searched in the array bank mapped by a hash bucket $B_i$, and if the search is successful, proceed to step (I2); otherwise, return that the operation fails. The hash bucket $B_i$ is a hash bucket corresponding to a hash value of a key $k_i$ in a hash table. In the hash table, each hash bucket is mapped to one array bank for storing the addresses of arrays in the array bank.

In (I2), after the key $k_i$ of the key-value pair data $[k_i, v_i]$ is stored in an assigned row, a valid flag bit thereof is set to $f_v$, and the value $v_i$ is written into an array row.

Further, the indexing operation further includes: a query operation, and the query operation includes the following:

In (S1), for a key $k_s$ to be queried, array addresses in a hash bucket $B_s$ are sequentially read, and a row $L_s$ storing the key $k_s$ and having the valid flag bit $f_v$ is searched in the corresponding array, and if the search is successful, proceed to step (S2); otherwise, return that the data does not exist. The hash bucket $B_s$ is a hash bucket corresponding to a hash value of the key $k_s$ in the hash table.

In (S2), a value vs is read from the row for storing the value corresponding to the row $L_s$ and returned.

Further, the indexing operation further includes: an update operation, and the update operation includes the following:

In (U1), for a key-value pair data $[k_u, v_u]$ to be updated, array addresses in a hash bucket $B_u$ are sequentially read, a row $L_u$ storing a key $k_u$ and having the valid flag bit $f_v$ is searched in the corresponding array, and if the search is successful, proceed to step (U2); otherwise, return that the data does not exist. The hash bucket $B_u$ is a hash bucket corresponding to a hash value of the key $k_u$ in the hash table.

In (U2), the value stored in the row corresponding to the row $L_u$ for storing the value is updated to $v_u$.

Further, the indexing operation further includes: a deletion operation, and the deletion operation includes the following:

In (D1), for a key $k_d$ to be deleted, array addresses in a hash bucket $B_d$ are sequentially read, a row $L_d$ storing the key $k_d$ and having the valid flag bit $f_v$ is searched in the corresponding array, and if the search is successful, proceed to step (D2); otherwise, return that the data does not exist.

The hash bucket $B_d$ is a hash bucket corresponding to a hash value of the key $k_d$ in the hash table.

In (D2), a valid flag bit of the row $L_d$ is set to $f_i$.

Further, the controller is further configured to perform a hash capacity expansion operation, and the hash capacity expansion operation includes the following.

In (E1), a capacity of the hash table is expanded to 2N and a corresponding relationship between each hash bucket and the array bank is determined, where N is the capacity of the current hash table, and N is a power of 2.

In (E2), each valid key stored in each array bank exists in a corresponding hash bucket of a new hash table is determined, and the valid key is moved to the array bank mapped by the corresponding hash bucket.

For any valid key k, a hash bucket serial number corresponding to the hash value thereof in the original hash table is recorded as i, and it is determined whether a $\log_2 N^{th}$ bit in the hash value is 0, and if yes, the hash bucket serial number corresponding to the valid key k in the new hash table is determined to be i; otherwise, the hash bucket serial number corresponding to the valid key k in the new hash table is determined to be i+N.

Further, the insertion operation further includes the following.

While the key $k_i$ is stored into the assigned row, high (H-$\log_2 N$) bits of the hash value of the key $k_i$ are stored as hash valid bits into an array row. The hash valid bits of the keys stored in the same array are stored in the same array and aligned in columns, and H represents a length of the hash value.

Further, in the hash capacity expansion operation, the method for obtaining the $\log_2 N^{th}$ bit in the hash value of the valid key includes the following.

The column where the hash valid bit corresponding to the $\log_2 N^{th}$ bit in the hash value is located is read from the array.

Further, in the hash table, a size of each hash bucket is the same as a size of a CPU cache line.

Further, in the hash table, different hash buckets are mapped to different array banks.

According to another aspect of the disclosure, a key-value pair storage system including the storage-computation integrated indexing system provided by the disclosure is provided.

In general, the above technical solutions provided by the disclosure have the following beneficial effects:

(1) In the storage-computation integrated indexing system provided by the disclosure, based on the coordinated implementation of a cross-point array composed of resistive memory cells and a hash table, an in-situ indexing operation is achieved by utilizing the content addressable function (parallel data comparison function) of the array. The key of a key-value pair is mapped to a hash bucket after passing through a hash function, and then the in-situ indexing operation of the array is used to complete the specific operation of the data. Due to the parallelism of the underlying hardware, the hash indexing steps are drastically reduced, especially when a hash conflict occurs, the hash indexing steps are significantly decreased in the disclosure. In general, the index operation performance is effectively improved in the disclosure.

(2) In a preferred technical solution of the disclosure, when performing hash capacity expansion, based on the capacity relationship of the hash table before and after the capacity expansion, only the corresponding bits in the hash value are used to determine the data movement position, so that the destination of all row data in the array is completed within the index system, and the data movement in the memory is completed without the participation of the CPU. In this way, data movement between the CPU and memory is reduced, the efficiency of hash capacity expansion is improved, the impact on indexing function during hash capacity expansion is lowered, and the overall indexing performance of the indexing system is further improved.

(3) In a further preferred technical solution of the disclosure, hash valid bits are determined in advance to indicate the destination of valid keys in the array each time the hash capacity is expanded, and these hash valid bits are stored in the array in a column-aligned manner. When the hash capacity is expanded, the corresponding hash valid bit columns are read from the array in parallel according to the capacity of the current hash table, so as to determine the destination of each valid key in the array. The entire process is completed within the indexing system, without the need for the CPU to participate in data movement, and the efficiency of hash capacity expansion is further improved.

(4) In a further preferred technical solution of the disclosure, in the hash table, the capacity of each hash bucket is the same as a CPU cache line, so that the CPU cache utilization is further improved.

(5) In a further preferred technical solution of the disclosure, in the hash table, different hash buckets are mapped to different array banks, the underlying hardware parallelism is maximized in this way, and the overall indexing performance is further improved.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the invention described below can be combined with each other as long as the technical features do not conflict with each other.

In the disclosure, the terms "first", "second", and the like (if any) in the disclosure and the accompanying drawings are used to distinguish similar objects, and are not necessarily used to describe a specific order or sequence.

In order to solve the technical problem that the existing indexing methods for key-value data may lead to frequent comparison and memory access, resulting in reduced indexing efficiency, the disclosure provides a storage-computation integrated indexing system and a key-value pair storage system. The overall idea is to implement in-situ index operations based on a hash table design on the basis of a content-addressable cross-point array, including insertion, query, update, deletion, etc., and support data movement within the memory. This simplifies the hash indexing steps and effectively improves the indexing operation performance.

Before explaining the technical solution of the disclosure in detail, the resistive memory cell and the cross-point array structure composed of the resistive memory cell are briefly introduced as follows first.

Figure 1:
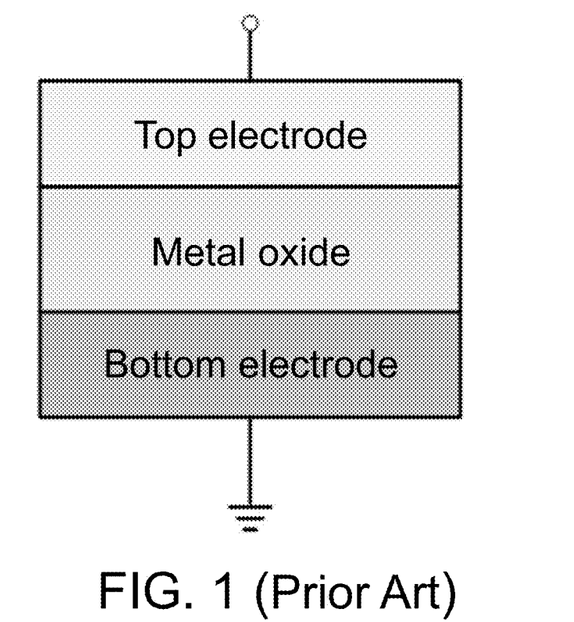
FIG. 1 is a schematic view of a structure of a resistive random access memory of the related art.

The structure of a resistive memory cell is shown in FIG. 1, and its basic structure consists of a resistive material, a bottom electrode, and a top electrode. The resistive material may be a metal oxide, etc., and its resistance may be reversibly switched between a high resistance state and a low resistance state under the action of an external electric field, so as to complete the writing of data. By applying a smaller voltage, data reading may be completed by measuring the outflowing current or the converted voltage without changing the cell state.

Figure 2:
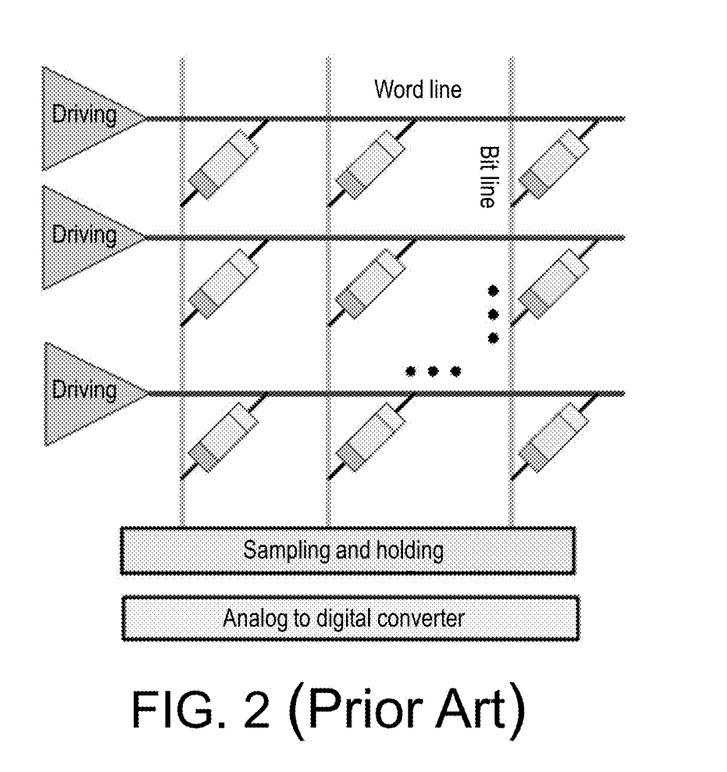
FIG. 2 is a schematic diagram of a cross-point array structure formed by the resistive random access memory of the related art.
Figure 3:
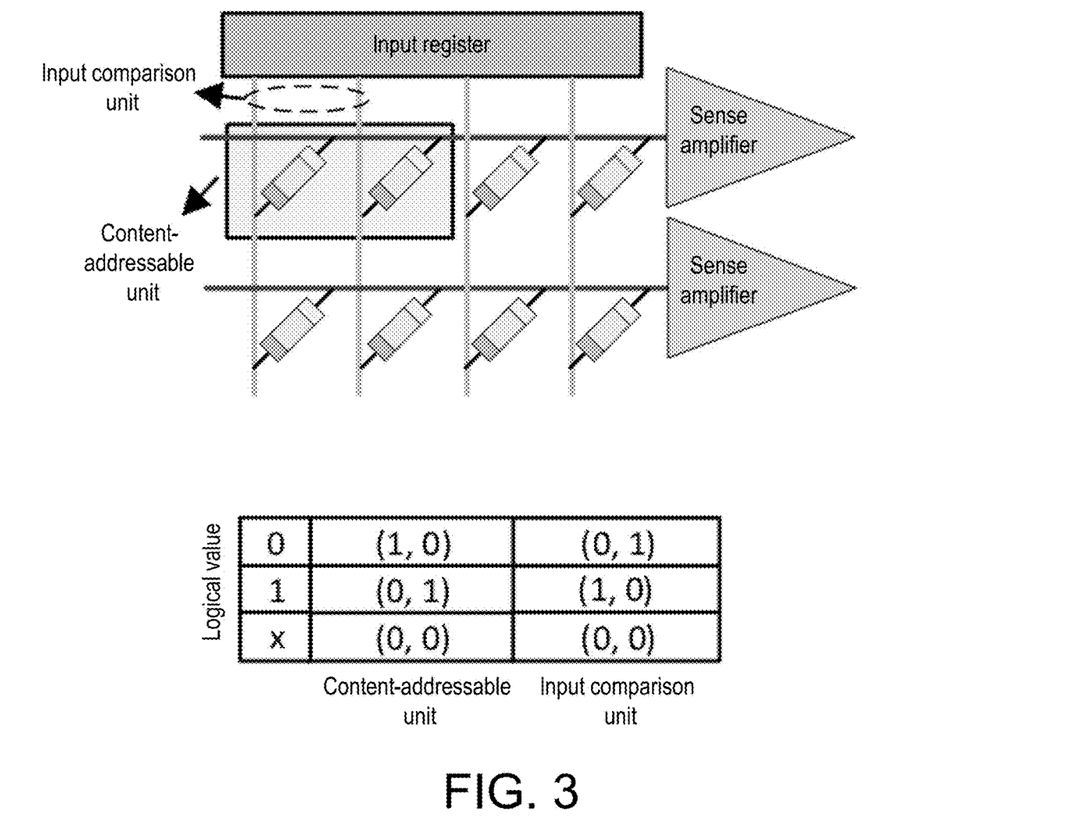
FIG. 3 is a schematic diagram of a content-addressable process of an array in an embodiment of the disclosure.

The cross-point array composed of resistive memory cells is shown in FIG. 2. A computation voltage may be applied across array word lines (rows). The matrix-vector multiplication result between the input calculated voltage vector and the conductivity matrix stored in the array is obtained by reading the current flowing out of the bit line (column). The implemented matrix-vector multiplication operation has a complexity of only O(1), so it is widely learned and used to accelerate neural networks, graph computing, and other applications dominated by matrix-vector multiplication. The cross-point array may also implement parallel data comparison operations, and the parallel data comparison function is also called the content-addressable function. By using the content-addressable function, the row in the array where the data stored is the same as the input data may be determined. FIG. 3 is a schematic diagram of a feasible content addressable implementation. In this implementation, two resistive memory cells are used to form a content-addressable unit, and the corresponding two columns form an input comparison unit. The content stored in the content-addressable unit may be determined according to a mapping relationship in the lower part of FIG. 3. For instance, if a logical value to be stored is 1, data actually stored in the content-addressable unit is (1, 0). With the help of an input register, each 1-bit input data is converted into input to two bit lines. The specific conversion rule is determined by the mapping relationship at the bottom of FIG. 3. For instance, when a logical value "0" is input, it is converted to (0, 1) in the input comparison unit. The input of more bit lines achieves the parallel comparison between the input multi-bit data and the data stored in each row. If a row of data stored in the array matches (is the same as) given input data, a sense amplifier (SA) inputs a "1" signal, otherwise it outputs a "0".

It should be noted that FIG. 3 shows only one method of implementing content addressability in a resistive memory cross-point array, and other implementation methods or other non-volatile memories or even conventional DRAM (dynamic random-access memory), SRAM (static random-access memory), and other memories that implement content addressability are all feasible.

In practical applications, key-value pair data is usually expressed as [key, value], where key represents the key and value represents the value corresponding to the key. In the following embodiments, a similar representation is used, and specifically, [k, v] is used to represent key-value pair data, where k and v represent the key and value, respectively.

Embodiments are provided as follows:

Embodiment 1

Figure 4:
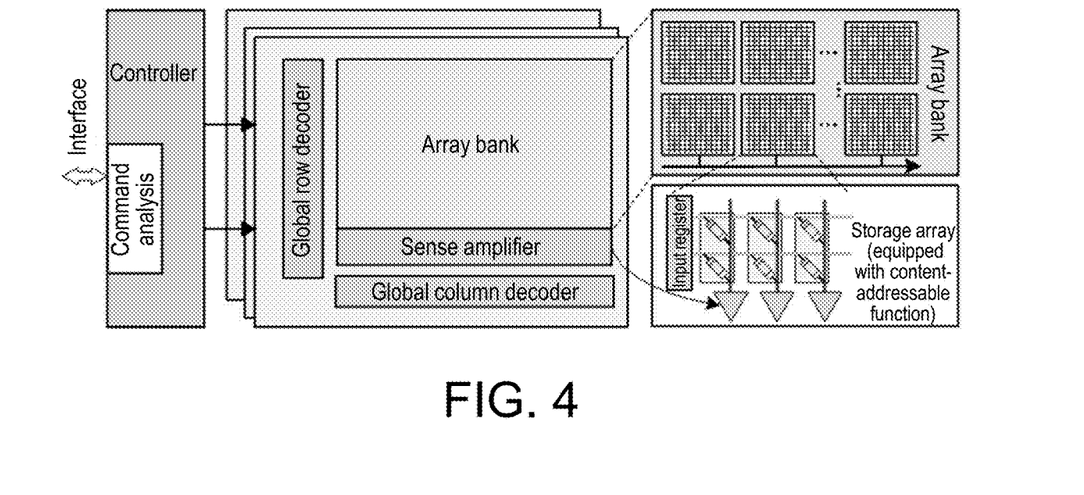
FIG. 4 is a schematic diagram of a hardware architecture of a storage-computation integrated indexing system provided in an embodiment of the disclosure.

A storage-computation integrated indexing system, as shown in FIG. 4, includes: a controller and a plurality of array banks.

The plurality of array banks are capable of operating in parallel, and each array bank includes a plurality of arrays. Each array is a cross-point array composed of resistive memory cells and content is addressable. In the array, each row is used to store a key and a valid flag bit thereof. The valid flag bit is used to indicate whether a corresponding row stores a valid key. In this embodiment, when a value of the valid flag bit is 1, it indicates that the corresponding row stores a valid key, and when the value of the valid flag bit is 0, it indicates that the corresponding row does not store a valid key. Initially, the valid flag bit of each row is 0.

Optionally, as shown in FIG. 4, in this embodiment, the array specifically adopts a storage architecture similar to a DRAM memory to construct storage-computation integrated indexing hardware, so as to avoid complex on-chip interconnection structures. The input register and sense amplifier required for the content addressable function may be shared with the input register and sense amplifier used for the storage function. It only needs to modify the sense amplifier to support two reference value comparisons, one for normal read operation and the other for content addressable operation. It should be noted that the hardware organization form shown in FIG. 4 is only an optional implementation of the embodiment of the disclosure, and in some other embodiments of the disclosure, other organizational forms such as H-tree may also be used to organize the array.

The controller is configured to perform an indexing operation on key-value pair data stored in the array. In this embodiment, the indexing operation specifically includes an insertion operation, a query operation, an update operation, and a deletion operation. These operations are all completed within the array.

In this embodiment, the key and its valid flag bit are stored in one array row, so that the input key and the valid flag bit may be compared in parallel. It is easy to understand that, in the initialization state, no data is inserted into any row of the array, and the valid flag bits of each row are all 0. After a row of data is deleted, its valid flag bit is also 0.

Figure 5:
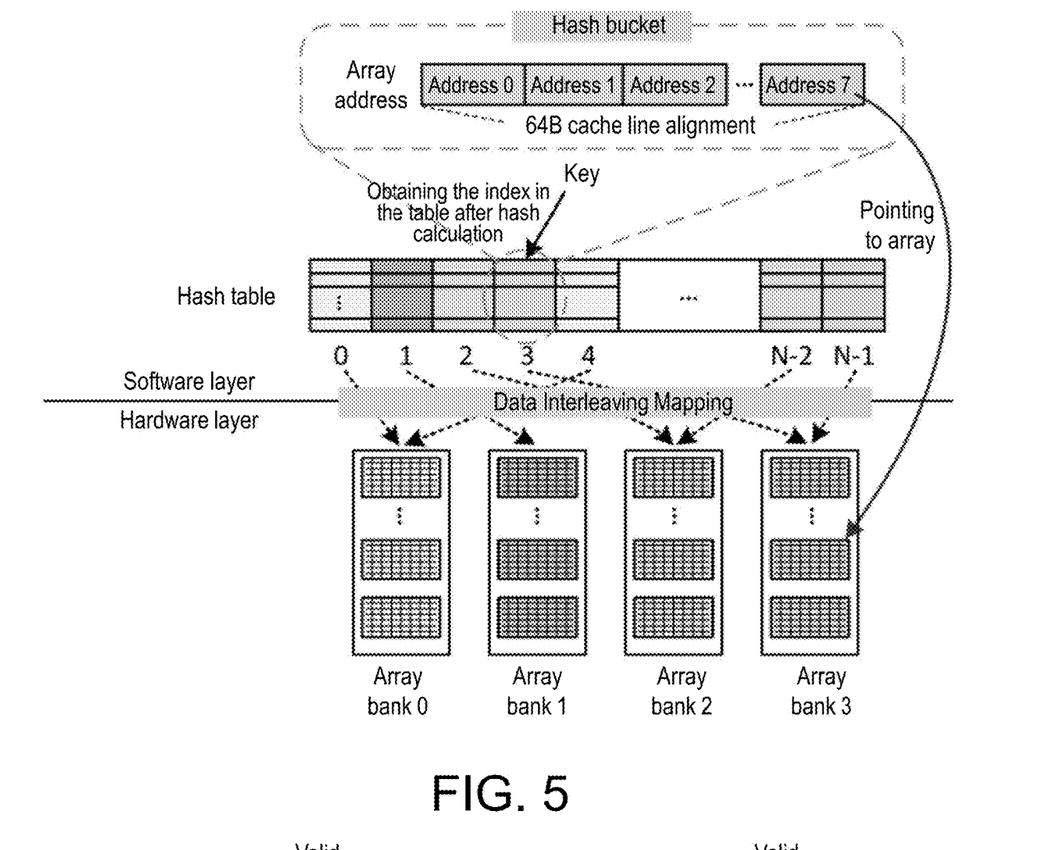
FIG. 5 a schematic diagram of a software-hardware collaborative hash index provided in an embodiment of the disclosure.

As shown in FIG. 5, a hash table that collaborates software and hardware is designed based on storage-computation integrated indexing hardware in this embodiment. In the hash table, each hash bucket is mapped to one array bank for storing the addresses of arrays in the array bank. Optionally, in this embodiment, a serial number of each array in the array bank is used as the address of the array bank, and each array address occupies 8B. A capacity of each hash bucket is the same as a CPU cache line, so that a hash bucket may store multiple array addresses to fill up a CPU cache line, and cache utilization of the CPU is thereby improved. To maximize the underlying hardware parallelism, in this embodiment, different hash buckets are mapped to different array banks. Since different array banks may operate in parallel, the system performance may thus be further improved.

In this embodiment, when a key value is mapped to a hash table, a hash bucket serial number mapped to it in the hash table is hash(k) % N, where hash(k) represents a hash value of a key k, N represents a current capacity of the hash table, and % represents a remainder operation.

Based on the designed hash table, in this embodiment, the key k of key-value pair data [k, v] is mapped to a hash bucket after the hash function, and then the corresponding operations may be performed on the arrays in the array bank mapped by the hash bucket. Similar to the conventional hash table-based indexing system, the CPU calculates the hash value hash(k) of the key k and locates the corresponding hash bucket in the hash table.

In this embodiment, the insertion operation includes the following.

In (I1), for key-value pair data $[k_i, v_i]$ to be inserted, a row with a valid flag bit $f_i$ is searched in the array bank mapped by a hash bucket $B_i$, and if the search is successful, proceed to step (I2); otherwise, return that the operation fails.

The hash bucket $B_i$ is a hash bucket corresponding to a hash value of a key $k_i$ in a hash table. In the hash table, each hash bucket is mapped to one array bank for storing the addresses of arrays in the array bank.

In (I2), after the key $k_i$ of the key-value pair data $[k_i, v_i]$ is stored in an assigned row, a valid flag bit thereof to $f_v$, and the value $v_i$ is written into an array row.

Figure 6:
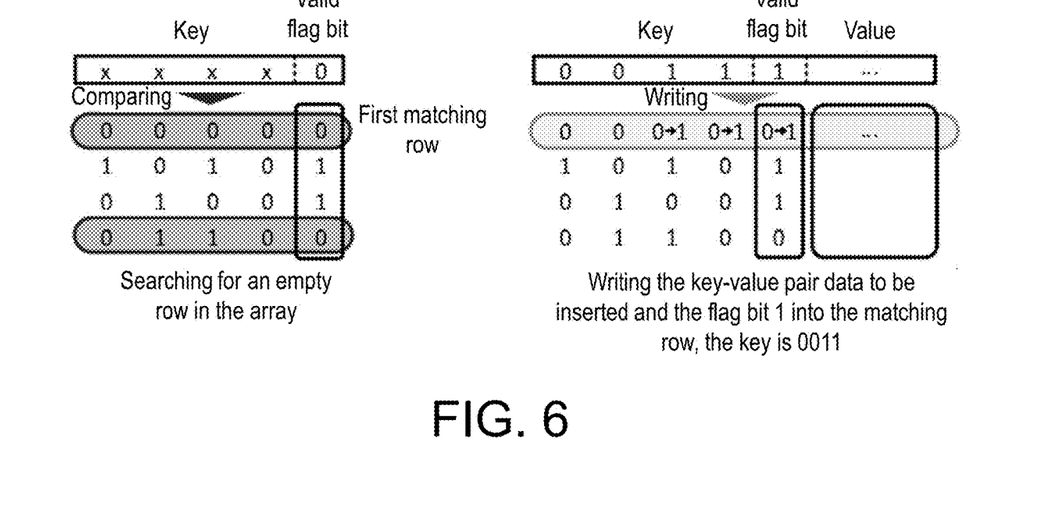
FIG. 6 is a schematic diagram of an insertion operation in an embodiment of the disclosure.

FIG. 6 shows an example of an insertion operation, and in this example, the key $k_i$ to be inserted=0011. The left side of FIG. 6 shows searching for an empty row in the array, that is, searching for a row whose valid flag bit is 0, and the right side of FIG. 6 shows writing data into the found empty row. It should be noted that if multiple empty rows are found in the array, just randomly select an empty row in this embodiment, the first empty row is selected, and if there is no empty row, the operation failure is returned. In addition, since the value v data does not need to participate in data comparison, it can be simply stored using one storage unit instead of a content addressable unit. In addition, the value $v_i$ may be stored in the same array as the key $k_i$ and the valid flag bit or in a different array. It is only necessary to obtain the matching row number of the key and operate on the corresponding row of the array where the value is located.

In this embodiment, the query operation includes the following.

In (S1), for a key $k_s$ to be queried, array addresses in a hash bucket $B_s$ are sequentially read, and a row $L_s$ storing the key $k_s$ and having the valid flag bit $f_v$ is searched in the corresponding array, and if the search is successful, proceed to step (S2); otherwise, return that the data does not exist.

The hash bucket $B_s$ is a hash bucket corresponding to a hash value of the key $k_s$ in the hash table.

In (S2), a value vs is read from the row for storing the value corresponding to the row $L_s$ and returned.

Figure 7:
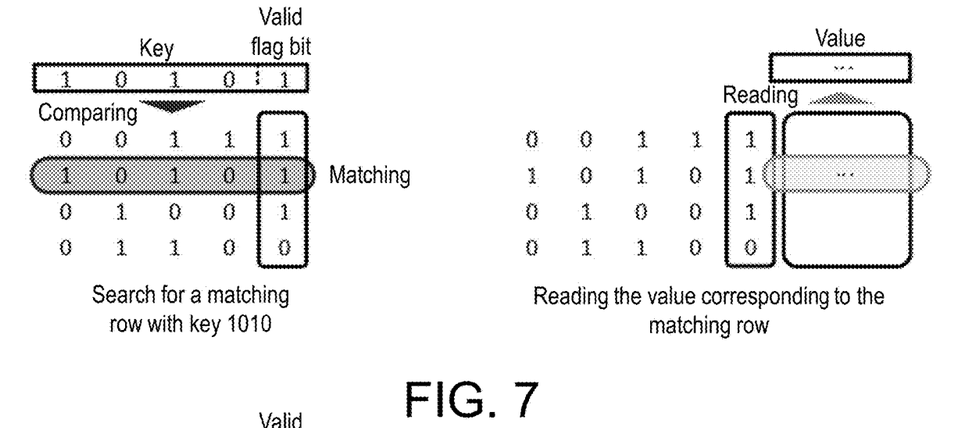
FIG. 7 is a schematic diagram of a query operation in an embodiment of the disclosure.

FIG. 7 shows an example of a query operation, and in this example, the key $k_s$ to be queried=1010. The left side of FIG. 7 shows searching for a valid row storing $k_s$, and the right side of FIG. 7 shows reading the required value vs from the array row storing the value corresponding to the row.

In this embodiment, the update operation includes the following.

In (U1), for a key-value pair data $[k_u, v_u]$ to be updated, array addresses in a hash bucket $B_u$ are sequentially read, a row $L_u$ storing a key $k_u$ and having the valid flag bit $f_v$ is searched in the corresponding array, and if the search is successful, proceed to step (U2); otherwise, return that the data does not exist.

The hash bucket $B_u$ is a hash bucket corresponding to a hash value of the key $k_u$ in the hash table.

In (U2), the value stored in the row corresponding to the row $L_u$ for storing the value is updated to $v_u$.

Figure 8:
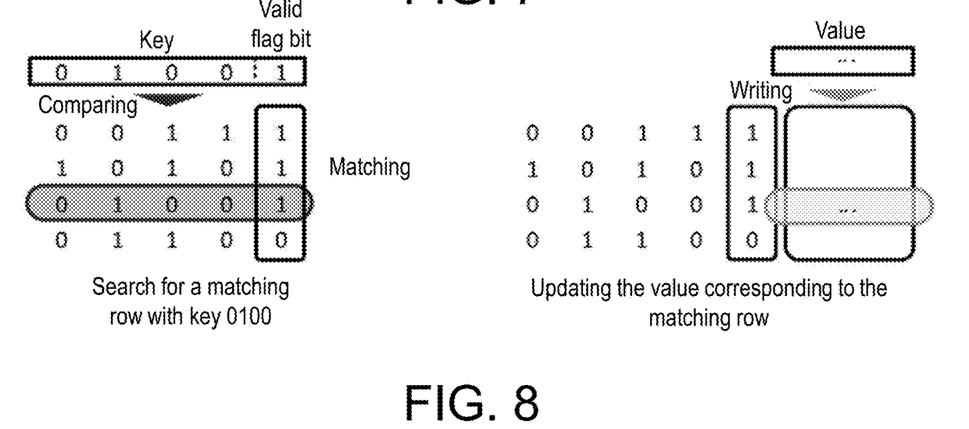
FIG. 8 is a schematic diagram of an update operation in an embodiment of the disclosure.

FIG. 8 shows an example of an update operation, and in this example, the key $k_u$ in the key-value pair data to be updated=0100. The left side of FIG. 8 shows searching for a valid row storing $k_u$, and the right side of FIG. 8 shows updating the row of the storage value corresponding to the row.

For the deletion operation, only the valid flag bit of a matching row needs to be cleared. Accordingly, in this embodiment, the deletion operation includes the following.

In (D1), for a key $k_d$ to be deleted, array addresses in a hash bucket $B_d$ are sequentially read, a row $L_d$ storing the key $k_d$ and having the valid flag bit $f_v$ is searched in the corresponding array, and if the search is successful, proceed to step (D2); otherwise, return that the data does not exist.

The hash bucket $B_d$ is a hash bucket corresponding to a hash value of the key $k_d$ in the hash table.

In (D2), a valid flag bit of the row $L_d$ is set to $f_i$.

Figure 9:
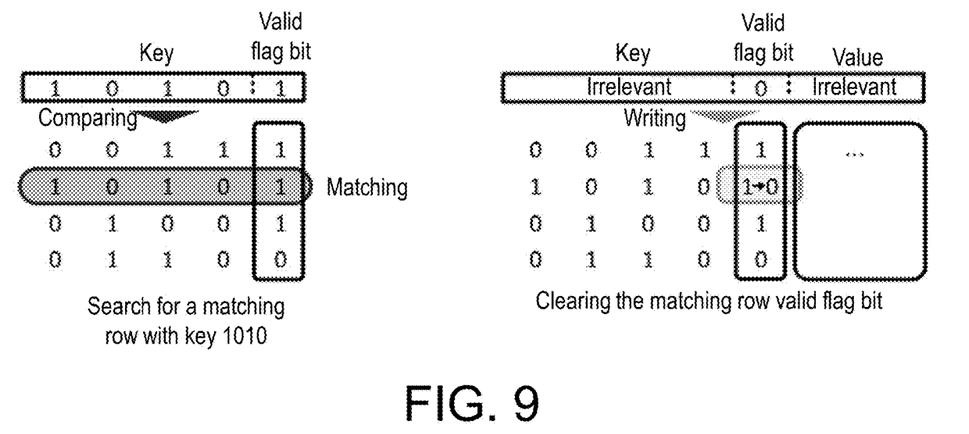
FIG. 9 is a schematic diagram of a deletion operation in an embodiment of the disclosure.

FIG. 9 shows an example of a deletion operation, and in this example, the key $k_d$ in the key-value pair data to be deleted=1010. The left side of FIG. 9 shows searching for a valid row storing $k_d$, and the right side of FIG. 9 shows clearing the valid flag bit of the row.

A corresponding hash table is designed based on a content-addressable array in this embodiment, so that an in-situ indexing operation may be implemented in the array. A large number of CPU memory access operations are eliminated, the indexing operation steps are effectively reduced, and the indexing operation efficiency is improved. Further, the parallelism of the underlying hardware is fully utilized, so the overall performance of the system is further improved.

As the number of key-value pair data that need to be indexed increases, the hash table may gradually become full, and when the remaining space in the hash table is decreased, hash capacity expansion is required. The process of hash capacity expansion involves data movement, and in order to further improve the performance of the indexing system, in-memory data movement is adopted in this embodiment. When the hash capacity is expanded, the calculation of the index value is converted from the original hash(k) % N to hash(k) %(2N). In this embodiment, the capacity N of the hash table is a power of 2. Therefore, after the data originally stored in the $i^{th}$ hash bucket is moved to the new hash bucket, it may be moved to the it hash bucket or the $i+N^{th}$ hash bucket of the new hash table, depending on whether the log $2(N)^{th}$ bit of the hash value hash(k) is 0 or 1. In this embodiment, this bit is used as a hash valid bit. If this bit is 0, after calculating the index value according to hash(k) %(2N), the array address of key k is still located in the it hash bucket, otherwise it is located in the $i+N^{th}$ hash bucket. Based on the above, in this embodiment, the controller is also used to perform a hash capacity expansion operation, and the hash capacity expansion operation includes the following:

In (E1), a capacity of the hash table is expanded to 2N and a corresponding relationship between each hash bucket and the array bank is determined, where N is the capacity of the current hash table, and N is a power of 2.

In (E2), each valid key stored in each array bank exists in a corresponding hash bucket of a new hash table is determined, and the valid key is moved to the array bank mapped by the corresponding hash bucket.

For any valid key k, a hash bucket serial number corresponding to the hash value thereof in the original hash table is recorded as i, and it is determined whether a $log_2$Nth bit in the hash value is 0, and if yes, the hash bucket serial number corresponding to the valid key k in the new hash table is determined to be i; otherwise, the hash bucket serial number corresponding to the valid key k in the new hash table is determined to be i+N.

In fact, in the hash value of the key, high (H-$log_2$N) bits are used as hash valid bits to indicate a destination of the valid keys in the array each time the capacity of the hash is expanded, and H represents a length of the hash value. In order to facilitate the use of this information, in this embodiment, these hash valid bits are stored in the array when the data is inserted. By using the parallel read function of the array, a hash valid bit of all rows of the array may be read, so that the destination of all rows of data in the array may be known in the memory, and the data movement in the memory may be completed. In this embodiment, the insertion operation further includes the following.

While the key $k_i$ is stored into the assigned row, high (H-$log_2$N) bits of the hash value of the key $k_i$ are stored as hash valid bits into an array row. The hash valid bits of the keys stored in the same array are stored in the same array and aligned in columns.

Further, in the hash capacity expansion operation, the method for obtaining the $log_2N^{th}$ bit in the hash value of the valid key includes the following.

The column where the hash valid bit corresponding to the $log_2N^{th}$ bit in the hash value is located is read from the array.

In this embodiment, data in-memory movement in hash capacity expansion may be achieved by supporting instructions similar to my (ori_addr, to_addr0, to_addr1, and bit_pos) for all valid keys stored in an array, where ori_addr represents the original array address, and bit_pos represents the bit_$pos^{th}$ hash valid bit in the hash value corresponding to the key. to_addr0 and to_addr1 represent the array addresses to which the data in the original array needs to be moved when the bit_$poS^{th}$ hash valid bit is 0 and 1, respectively, and are determined according to the array banks mapped by the it hash bucket and the i+$N^{th}$ hash bucket in the new hash table, respectively. When the hash valid bit is 0, the valid key is moved from the array corresponding to ori_addr to the array corresponding to to_addr0, and when the hash valid bit is 1, the valid key is moved from the array corresponding to ori_addr to the array corresponding to to_addr1.

Through the above-mentioned hash capacity expansion operation, hash capacity expansion may be completed only by moving data in memory without CPU participation in this embodiment, so the efficiency of hash capacity expansion is further improved.

Embodiment 2

A key-value pair storage system including the storage-computation integrated indexing system provided in the above-mentioned Embodiment 1 is provided.

In the key-value storage system, the indexing system defines the way key-value data is stored and completes the storage of key-value data. Based on the storage-computation integrated indexing system provided in the above-mentioned Embodiment 1, the key-value pair storage system provided in this embodiment can provide efficient data operations, and the performance is effectively improved.

It is easy to understand that in this embodiment, other modules that cooperate with the indexing system are also included, such as a monitoring and management module, a security and authority control module, a load balancing module, a backup module, and other modules that improve availability/reliability. The specific implementation of these modules is the same as that of the conventional key-value storage system, so their description is not repeated herein.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A storage-computation integrated indexing system, characterized in comprising: a controller and a plurality of array banks;

wherein the plurality of array banks are capable of operating in parallel, each of the array banks comprises a plurality of arrays, each of the arrays is a cross-point array composed of resistive memory cells and content is addressable, in each of the arrays, each row is used to store a key and a valid flag bit thereof, when a value of the valid flag bit is $f_v$, it indicates that a corresponding row stores a valid key, when the value of the valid flag bit is $f_i$, it indicates that the corresponding row does not store a valid key, $f_v \neq f_i$, and initially, the valid flag bit of each row is $f_i$, the controller is configured to perform an indexing operation on key-value pair data stored in each of the arrays, the indexing operation comprises: an insertion operation, and the insertion operation comprises:

(I1) for key-value pair data [$k_i$, $v_i$] to be inserted, searching for a row with a valid flag bit $f_i$ in an array bank mapped by a hash bucket $B_i$, and if search is successful, proceeding to step (I2); otherwise, returning that operation fails, wherein the hash bucket $B_i$ is a hash bucket corresponding to a hash value of a key $k_i$ in a hash table, and in the hash table, each hash bucket is mapped to one array bank for storing addresses of arrays in the one array bank; and (I2) after storing the key $k_i$ of the key-value pair data [$k_i$, $v_i$] into an assigned row, setting the valid flag bit thereof to $f_v$ and writing the value $v_i$ into an array row.

2. The storage-computation integrated indexing system according to claim 1, wherein the indexing operation further comprises: a query operation, and the query operation comprises:

(S1) for a key $k_s$ to be queried, sequentially reading array addresses in a hash bucket $B_s$, searching a row $L_s$ storing the key $k_s$ and having the valid flag bit $f_v$ in a corresponding array, and if search is successful, proceeding to step (S2); otherwise, returning that data does not exist, wherein the hash bucket $B_s$ is a hash bucket corresponding to a hash value of the key $k_s$ in the hash table; and (S2) reading and returning a value $v_s$ from the row for storing the value corresponding to the row $L_s$.

3. The storage-computation integrated indexing system according to claim 1, wherein the indexing operation further comprises: an update operation, and the update operation comprises:
- (U1) for a key-value pair data [$k_u$, $v_u$] to be updated, sequentially reading array addresses in a hash bucket $B_u$, searching a row $L_u$ storing a key $k_u$ and having the valid flag bit $f_v$ in a corresponding array, and if search is successful, proceeding to step (U2); otherwise, returning that data does not exist,
  wherein the hash bucket $B_u$ is a hash bucket corresponding to a hash value of the key $k_u$ in the hash table; and
- (U2) updating the value stored in the row corresponding to the row $L_u$ for storing the value to $v_u$.

4. The storage-computation integrated indexing system according to claim 1, wherein the indexing operation further comprises: a deletion operation; the deletion operation comprises:
- (D1) for a key $k_d$ to be deleted, sequentially reading array addresses in a hash bucket $B_d$, searching a row $L_d$ storing the key $k_d$ and having the valid flag bit $f_v$ in a corresponding array, and if search is successful, proceeding to step (D2); otherwise, returning that data does not exist,
  wherein the hash bucket $B_d$ is a hash bucket corresponding to a hash value of the key $k_d$ in the hash table; and
- (D2) setting a valid flag bit of the row $L_d$ to $f_i$.

5. The storage-computation integrated indexing system according to claim 1, wherein the controller is further configured to perform a hash capacity expansion operation, and the hash capacity expansion operation comprises:
- (E1) expanding a capacity of the hash table to 2N and determining a corresponding relationship between each hash bucket and each of the array banks, wherein N is a capacity of a current hash table, and N is a power of 2; and
- (E2) determining that each valid key stored in each of the array banks exists in a corresponding hash bucket of a new hash table and moving the valid key to an array bank mapped by the corresponding hash bucket,
  wherein for any valid key k, a hash bucket serial number corresponding to the hash value thereof in an original hash table is recorded as i, and it is determined whether a $\log_2 N^{th}$ bit in the hash value is 0, and if yes, the hash bucket serial number corresponding to the valid key k in the new hash table is determined to be i; otherwise, the hash bucket serial number corresponding to the valid key k in the new hash table is determined to be i+N.

6. The storage-computation integrated indexing system according to claim 5, wherein the insertion operation further comprises:
while storing the key $k_i$ into the assigned row, storing high (H-$\log_2 N$) bits of the hash value of the key $k_i$ as hash valid bits into the array row, wherein the hash valid bits of keys stored in a same array are stored in the same array and aligned in columns, and H represents a length of the hash value,
and, in the hash capacity expansion operation, a processing for obtaining a $\log_2 N^{th}$ bit in the hash value of the valid key comprises
reading a column where the hash valid bit corresponding to the $\log_2 N^{th}$ bit in the hash value is located from the array.

7. The storage-computation integrated indexing system according to claim 1, wherein in the hash table, a size of each hash bucket is the same as a size of a cache line of a central processing unit (CPU).

8. The storage-computation integrated indexing system according to claim 1, wherein in the hash table, different hash buckets are mapped to different array banks.

9. A key-value pair storage system comprising the storage-computation integrated indexing system according to claim 1.

* * * * *